R. CRAIG.
PITLESS TURN TABLE.
APPLICATION FILED DEC. 20, 1916.

1,237,022.

Patented Aug. 14, 1917.

Inventor
Robert Craig
by Graham & Harris
Attorneys.

UNITED STATES PATENT OFFICE.

ROBERT CRAIG, OF LOS ANGELES, CALIFORNIA.

PITLESS TURN-TABLE.

1,237,022.  Specification of Letters Patent.  Patented Aug. 14, 1917.

Application filed December 20, 1916. Serial No. 138,115.

*To all whom it may concern:*

Be it known that I, ROBERT CRAIG, a citizen of the United States, residing at Los Angeles, in the county of Los Angeles and State of California, have invented a new and useful Pitless Turn-Table, of which the following is a specification.

My invention relates to automobile turn-tables, and more particularly to turn-tables which are adapted to be installed entirely above a floor, without the necessity for the expensive pit arrangements found in many forms of automobile turn-tables.

The principal object of my invention is to provide a pitless turn-table which will be extremely cheap to construct and install, in which a minimum amount of material is necessary, and which requires a minimum amount of energy to operate.

Referring to the drawings, which are for illustrative purposes only:

Figure 1:
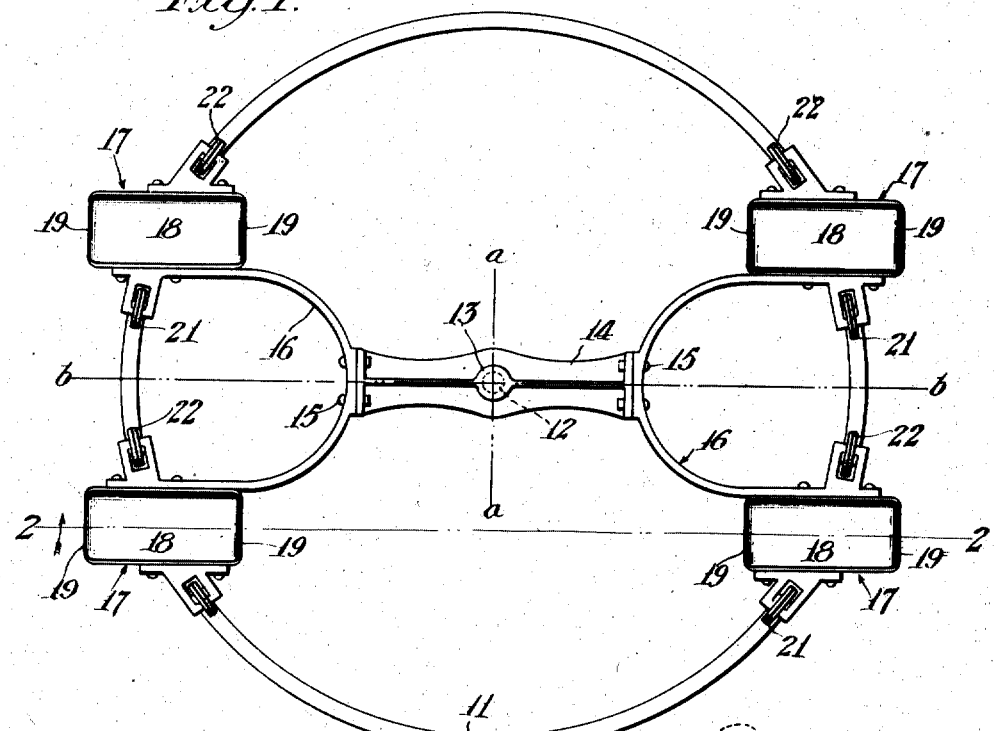
Figure 1 is a plan view of a turn table embodying my invention.

My invention consists of a track 11 which is concentrically located around a central post 12. Pivoted on the central post 12 is a bearing 13 which is formed on a center arm 14, this center arm 14 being symmetrical around a line $a$—$a$ and being secured by means of bolts 15 to pan supports 16.

Figure 2:
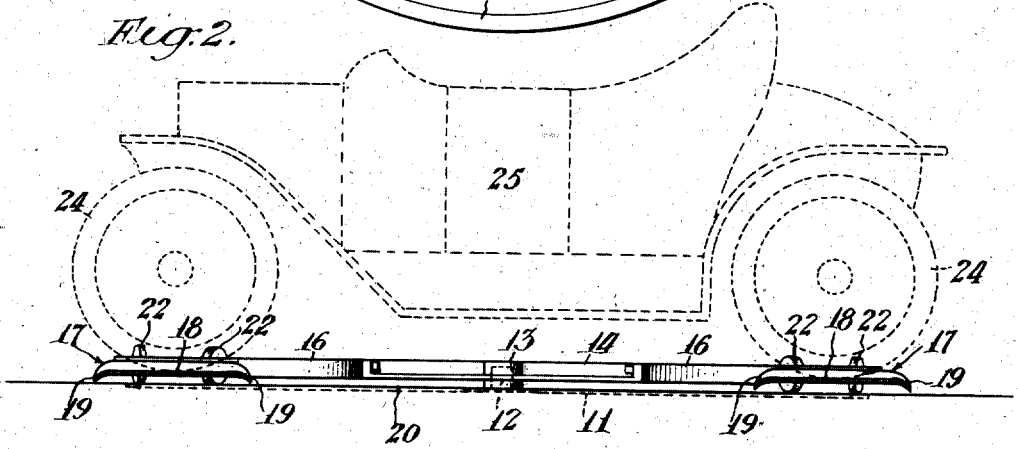
Fig. 2 is a section on a plane represented by the line 2—2 of Fig. 1, this plane being viewed in the direction of the arrows.

Secured to each of the pan supports 16, which are symmetrical around a line $b$—$b$, is a wheel pan 17, these pans 17 consisting of a flat central portion 18 with beveled ends 19 which extend down to a point very close to the floor 20 upon which the turn-table track is mounted. Secured on the pan supports 16, on either side of the pan 17, is a pair of wheels 21 and 22, these wheels being so located that they travel on the track 11. The wheel pans 17 are comparatively short, being properly spaced to receive the wheels 24 of an automobile 25 which is shown in dotted lines in Fig. 2.

The particular merit of my invention, over previous forms of automobile turn-tables, lies in the fact that the wheel pans 17 are made very short. In previous forms of pitless turn-tables, long girder constructions extending completely across the turn-table have been used in place of the pans 17. That is to say, in place of the two short pans, similar to those shown at 17, a long runway or girder has been used, this girder extending completely across the turn-table, each runway occupying the space of two of the pans 17. As any automobile is quite heavy, it has been necessary to make these runways or girders sufficiently strong and stiff to support one end of an automobile as the wheels roll along them. That is to say; as the automobile passes onto the turn-table in a forward direction the front wheels roll on the runway or girder and are entirely supported by that runway or girder until the automobile has reached its final position on the turn-table. This form of construction has required very stiff girder members, and has been relatively expensive to construct, and relatively hard to operate on account of excess weight.

In my form of construction, the short pans only support the wheels in and near their final position, the front wheels of the automobile rolling over the first pans onto the floor and being supported by the floor until the four wheels are ready to pass onto the four pans and be supported thereby.

By my form of construction I am not only able to make the pan 17 of very light construction, but I am able to greatly lighten all of the remaining structure. Where a suitable floor is available, the track 11 may be omitted, the rollers 21 and 22 rolling entirely on the floor.

The central post 12, and its bearing 13, are used simply to keep the wheels 21 and 22 on the track, and may be dispensed with if flanged wheels, or other construction, be used to prevent the wheels leaving the track.

I claim as my invention:—

1. A pitless turn-table comprising a center post secured in a floor, four pans on which the four wheels of an automobile may be supported, said pans being in close proximity to said floor, rollers on which said pans are supported, and means for connecting said pans to a center post.

2. A pitless turn-table comprising a center post secured in a floor, four pans on which the four wheels of an automobile may be supported, said pans being in close proximity to said floor, rollers on which said pans are supported, two pan supports, each pan support connecting a pair of pans together, a center arm connecting said pan supports together, and a bearing formed on said center arm and engaging said post.

3. A pitless turn-table comprising a center post secured in a floor, four pans on which the four wheels of an automobile may be supported, said pans being in close proximity to said floor, rollers on which said pans are supported, a circular track concentric about said center post on which said rollers roll, and means for connecting said pans to a center post.

4. A pitless turn-table comprising a center post secured in a floor, four pans on which the four wheels of an automobile may be supported, said pans being in close proximity to said floor, rollers on which said pans are supported, a circular track concentric about said center post on which said rollers roll, two pan supports, each pan support connecting a pair of pans together, a center arm connecting said pan supports together, and a bearing formed on said center arm and engaging said post.

5. A pitless turn-table for automobiles comprising four pans so located that one of the wheels of an automobile may be supported on each pan; a frame for connecting said pans together; and friction reducing means on which said pans and frame may turn.

6. A pitless turn-table for automobiles comprising four pans so located that one of the wheels of an automobile may be supported on each pan; a frame for connecting said pans together; a circular track; and rollers on said frame rolling on said track.

7. A pitless turn-table for automobiles comprising four pans so located that one of the wheels of an automobile may be supported on each pan; a frame for connecting said pans together; and a central post around which said frame may turn.

In testimony whereof, I have hereunto set my hand at Los Angeles, California, this 14th day of December, 1916.

ROBERT CRAIG.